(12) United States Patent
Han

(10) Patent No.: US 7,171,247 B2
(45) Date of Patent: Jan. 30, 2007

(54) HINGE DEVICE

(75) Inventor: Young-Soo Han, Gunpo-Si (KR)

(73) Assignee: Phoenix Korea Co., Ltd. (KR)

( * ) Notice: Subject to any disclaimer, the term of this patent is extended or adjusted under 35 U.S.C. 154(b) by 284 days.

(21) Appl. No.: 10/693,638

(22) Filed: Oct. 24, 2003

(65) Prior Publication Data
US 2004/0137970 A1   Jul. 15, 2004

Related U.S. Application Data

(63) Continuation of application No. PCT/KR01/02220, filed on Dec. 20, 2001.

(30) Foreign Application Priority Data
Apr. 26, 2001   (KR)   ............................... 2001-22742

(51) Int. Cl.
*H04M 1/00*   (2006.01)
(52) U.S. Cl. ............... 455/575.3; 455/575.4; 455/550.1; 16/330; 16/303; 379/433; 379/428
(58) Field of Classification Search ............ 455/575.3, 455/575.4, 550.1; 16/330, 303; 379/433, 379/428
See application file for complete search history.

(56) References Cited

U.S. PATENT DOCUMENTS

| | | |
|---|---|---|
| 4,897,873 A | 1/1990 | Beutler et al. |
| 5,185,790 A | 2/1993 | Mischneko |
| 5,259,019 A | 11/1993 | Stilley |
| 5,274,882 A | 1/1994 | Persson |
| 5,628,089 A | 5/1997 | Wilcox et al. |
| 5,651,063 A | 7/1997 | Ji et al. |
| 5,661,797 A | 8/1997 | Leman et al. |
| 5,704,094 A | 1/1998 | Hartigan et al. |
| 5,732,135 A | 3/1998 | Weadon et al. |
| 5,761,300 A | 6/1998 | Domoleczny |
| 5,764,760 A | 6/1998 | Grandbert et al. |
| 5,799,079 A | 8/1998 | Inoue |
| 5,937,062 A | 8/1999 | Sun et al. |
| 6,065,187 A | 5/2000 | Mischenko |
| 6,115,886 A * | 9/2000 | Fujita ......................... 16/330 |

(Continued)

FOREIGN PATENT DOCUMENTS

JP   (HEI) 8-65369   3/1996

(Continued)

*Primary Examiner*—Danh Cong Le
(74) *Attorney, Agent, or Firm*—Knobbe, Martens, Olson & Bear, LLP (57) ABSTRACT

The present invention provides a hinge for coupling a stationary member with a movable member which can be relatively moved to folded and unfolded positions with respect to the stationary member. The hinge includes a housing, a cam member having a cam, a cam follower member provided with a cam follower portion interacting with the cam, and a resilient member for urging the cam member. The cam member can perform a linear motion within the housing and the cam follower member can perform a rotational motion. The cam member includes a cam surface, the cam surface includes peaks and valleys, and each valley is provided with two or more stopping grooves. The cam follower member includes protrusions protruding toward the cam surface and ends of the protrusions can be inserted into the stopping grooves.

50 Claims, 5 Drawing Sheets

U.S. PATENT DOCUMENTS

| | | | |
|---|---|---|---|
| 6,292,980 B1 * | 9/2001 | Yi et al. | 16/303 |
| 6,523,224 B1 * | 2/2003 | Oshima et al. | 16/335 |
| 6,745,463 B1 * | 6/2004 | Chou | 29/852 |
| 6,772,481 B2 * | 8/2004 | Oshima et al. | 16/330 |
| 6,963,677 B1 * | 11/2005 | Spickermann et al. | 385/16 |

FOREIGN PATENT DOCUMENTS

| | | |
|---|---|---|
| KR | 94-25244 | 11/1994 |
| KR | 94-27373 | 12/1994 |
| KR | 94-27375 | 12/1994 |
| KR | 95-3838 | 5/1995 |
| KR | 95-16135 | 6/1995 |
| KR | 95-28895 | 10/1995 |
| KR | 96-3356 | 1/1996 |
| KR | 96-6945 | 5/1996 |
| KR | 96-20217 | 6/1996 |
| KR | 96-9192 | 10/1996 |
| KR | 96-34654 | 10/1996 |
| KR | 96-35780 | 11/1996 |
| KR | 97-3514 | 1/1997 |
| KR | 97-9071 | 2/1997 |
| KR | 97-15497 | 4/1997 |
| KR | 97-19181 | 4/1997 |
| KR | 97-47849 | 7/1997 |
| KR | 122503 | 11/1997 |
| KR | 97-64422 | 12/1997 |
| KR | 20-1999-004655 | 2/1999 |
| KR | 20-1999-0026978 | 7/1999 |
| KR | 20-0168344 | 11/1999 |
| KR | 20-0183262 | 3/2000 |
| KR | 20-0340243 | 7/2000 |
| KR | 20-0222454 | 2/2001 |
| KR | 20-0225611 | 3/2001 |
| KR | 1020020049395 A | 6/2002 |
| KR | 1020020072828 A | 9/2002 |
| WO | WO 92/17973 | 3/1992 |
| WO | WO 92/17974 | 3/1992 |
| WO | WO 93/18592 | 9/1993 |
| WO | WO 90/05421 | 10/1998 |

* cited by examiner

HINGE DEVICE

RELATED APPLICATIONS

This application is a continuing application under 35 U.S.C. § 365 (c) claiming the benefit of the filing date of PCT Application No. PCT/KR01/02220 designating the United States, filed Dec. 20, 2001. The PCT Application was published in English as WO 02/089343 A1 Nov. 2, 2002, and claims the benefit of the earlier filing date of Korean Patent Application No. 2001/22742, filed Apr. 26, 2001. The contents of the Korean Patent Application No. 2001/22742 and the international application No. PCT/KR01/02220 including the publication WO 02/089343 A1 are incorporated herein by reference in their entirety.

BACKGROUND OF THE INVENTION

1. Field of the Invention

The present invention relates generally to a hinge device, and more particularly to a hinge for coupling two members in a device such as a portable radiotelephone comprising of two members that can be moved to folded and unfolded positions of the device with respect to each other about an axis, if so desired.

2. Description of the Related Art

A portable device such as a portable folder-type radiotelephone includes a keypad provided with a plurality of keys and a liquid crystal display. Usually, in the folder-type radiotelephone, the keypad is placed on one member while the liquid crystal display is placed on the other member. When the radiotelephone is not in use, the keypad or the liquid crystal display is moved to a folded position of the radiotelephone to face each other. Alternatively, when the radiotelephone is in use, the keypad or the liquid crystal display is moved to an unfolded position of the radiotelephone. It is the hinge that allows the two members to be coupled to each other and to be smoothly moved to the folded and unfolded positions.

The portable device such as the radiotelephone becomes smaller in size, but has more various implementing functions. This feature is especially notable in a radiotelephone based on standards known as IMT 2000. In addition to telephonic communication by the radiotelephone, a user can input short messages and send them by using a short message service (SMS), or view moving pictures. In some cases, the user may also use the Internet.

The conventional radiotelephone is usually unfolded or opened only at a single angle. The unfolded angle is determined through a preference survey. Recently, the radiotelephone has various functions provided to the user. The user's own preference regarding the unfolded angle varies according to each function. Therefore, it is improbable that the radiotelephone with the single unfolded angle would satisfy such user's demands.

SUMMARY OF THE INVENTION

One aspect of the present invention provides a hinge for use with an electronic device. The hinge comprises: a cam comprising a cam surface and at least two stop surfaces formed therein; a cam follower comprising at least one cam following tip arranged to contact the cam surface; and a resilient member arranged to provide a force to urge the cam and the cam follower toward each other, thereby maintaining the contact between the cam follower and the cam. Here, one of the cam and the cam follower is rotatable about an axis, while the other is substantially non-rotatable about the axis. The cam surface comprises an area configured such that contacting the area by the at least one cam following tip causes a spontaneous rotational movement of the rotatable member about the axis in a rotational direction. Each stop surface is configured such that contacting the stop surface by the at least one cam following tip causes to stop the spontaneous rotational movement.

The above-described hinge further comprises a housing configured to at least partially enclose the cam, the cam follower and the resilient member. The rotational member is rotatable relative to the housing. The rotational member has a part protruding outside the housing, and wherein the protruding part is configured to be engaged with a piece of an electronic device. The hinge further comprises a housing engaged with the non-rotatable member. The cam is the non-rotatable member, and wherein the cam follower is the rotatable member. The cam surface is waving with reference to an imaginary plane perpendicular to the axis. The at least one cam following tip is configured to move on the cam surface along a substantially closed path. The cam surface comprises an area that does not cause a spontaneous rotational movement of the rotatable member.

In the above-described hinge, the spontaneous rotational movement is for a rotational angle about the axis at least about 2°, at least about 5° or at least about 10°. The cam surface and the at least one cam following tip are arranged such that a rotational movement of the rotatable member about the axis causes a linear movement of the non-rotatable member along the axis. The cam surface is configured such that a forced rotational movement of the rotatable member about the axis beyond a predetermined point causes a spontaneous rotational movement of the rotatable member about the axis in the same rotational direction. The cam surface is configured such that a forced rotational movement of the rotatable member about the axis in a rotational direction up to less than a predetermined point causes a spontaneous rotational movement of the rotatable member about the axis in a rotational direction opposite to the forced rotational movement. The cam surface comprises at least two sloped surfaces, which are sloped with reference to one another, wherein two of the at least two sloped surfaces meet and form at least one valley or peak along where the two sloped surfaces meet. The at least one valley constitutes one of the at least two stop surfaces. One of the at least two stop surfaces is located on an area of the at least two sloped surfaces, and wherein the area does not constitute the at least one valley or peak. One the at least two stop surfaces comprises a groove formed in the cam surface. One of the at least two stop surfaces comprises a bump formed on the cam surface. One of the at least two stop surfaces is configured to receive the at least one cam following tip.

Still in the above-described hinge, each stop surface is further configured to substantially maintain relative positions of the cam and the cam follower. Each stop surface is formed along a trajectory of at least one cam following tip. Each stop surface is configured to substantially block movement of the at least one cam following tip along a path thereof on the cam surface. Each stop surface comprises a threshold over which the at least one cam following tip is configured to move. The cam and the cam follower are configured such that the at least one cam following tip moves along a substantially closed path as the rotatable member rotates 360° about the axis. The cam surface comprises at least one peak along a closed path about the axis. The cam surface comprises a closed contour surface around the axis, and wherein the closed contour surface comprises at least two uphills and at least two downhills. The hinge further comprises a guide hole and a guide rod, wherein the guide hole is formed along the axis in either of the cam and the cam follower, wherein the guide rod extends from the other of the cam and the cam follower, and wherein the guide rod is configured to be inserted in the guide hole. The cam follower comprises two protrusions positioned substantially diametrically with respect to the axis and extending toward the cam surface, and wherein a distal end of each protrusion constitutes the at least one cam following tip. Each cam following tip is configured such that a point of the contact of the cam following tip with the cam surface moves as the cam and the cam follower moves relative to each other. The hinge further comprises an adapter configured to engaged with the rotatable member and further configured to engage with an electronic device.

Another aspect of the present invention provides a method of operating the above-described hinge. The method comprises: rotating the rotatable member in a first rotational direction about the axis up to less than a predetermined angle; and allowing the rotatable member to spontaneously rotate in a second rotational direction opposite to the first rotational direction about the axis. Alternatively, the method comprises: rotating the rotatable member in a first rotational direction about the axis beyond a first predetermined angle; and allowing the rotatable member to spontaneously rotate in the first rotational direction about the axis to a first stop angle. The foregoing method further comprises: rotating the rotatable member in the first rotational direction about the axis from the first stop angle up to less than a second predetermined angle; and allowing the rotatable member to spontaneously rotate in a second rotational direction opposite to the first rotational direction about the axis back to the first stop angle. The foregoing method further comprises: rotating the rotatable member in the first rotational direction about the axis from the first stop angle beyond a second predetermined angle; allowing the rotatable member to spontaneously rotate in the first rotational direction about the axis to a second stop angle.

Another aspect of the present invention provides a hinged electronic device, The device comprises: at least two body pieces comprising first and second body pieces; the hinge of Claim 1, connecting the first and second body pieces; and the first body piece being connected with the rotatable member; the second body piece being connected with the non-rotatable member. The first and second body pieces are configured to rotate about the axis relative to each other. In this electronic device, the connection between the first body piece and the rotatable member is such that the first body piece is substantially not rotatable with reference to the rotatable member about the axis. The electronic device further comprises an adapter via which the first body piece and the rotatable member are connected. The connection between the second body piece and the non-rotatable member is such that the second body piece is substantially not rotatable with reference to the non-rotatable member about the axis, while allowing a linear movement of the non-rotatable member with reference to the non-rotatable member along the axis.

The above-described electronic device further comprises a housing configured to at least partially enclose the cam, the cam follower and the resilient member, wherein the second body piece and the non-rotatable member are connected via the housing. The second body piece defines a hollow for receiving the housing. At least one of the first and second body pieces comprises a display panel. At least one of the first and second body pieces comprises a keypad for inputting characters or numbers. The electronic device further comprises an additional hinge, wherein the first and second body pieces are connected with each other via the two hinges. The first and second body pieces are configured to rotate with each other about the axis between an open configuration and a closed configuration, and wherein in either of the open and closed configurations, the first and second body pieces can rotate with each other about the axis in one rotational direction only. The first and second body pieces are configured to spontaneously rotate relative to the other in a rotational direction about the axis if the first and second body pieces are positioned between the open and closed configurations and if the at least one cam following tip is contacting the area of the cam surface.

A further aspect of the present invention provides a method of operating the above-described hinged electronic device. The method comprises: rotating the first body piece in a rotational direction about the axis relative to the second body piece beyond a predetermined point; and allowing a spontaneous rotational movement of the first body piece relative to the second body piece in the same rotational direction about the axis. In the method, the spontaneous rotational movement is stopped when the at least one cam following tip contacts one of the at least two stop surfaces. Alternatively, the method of operating the hinged electronic device comprises rotating the first body piece in a rotational direction about the axis relative to the second body piece until the at least one cam following tip contacts one of the at least two stop surfaces. Still alternatively, the method comprises: rotating the first body piece in a rotational direction about the axis relative to the second body piece up to less than a predetermined point; and allowing a spontaneous rotational movement of the first body piece relative to the second body piece in the opposite rotational direction about the axis.

An alternative construction of the hinge according to the present invention comprises: a cam comprising a cam surface; a cam follower comprising at least one cam following tip arranged to contact the cam surface; a resilient member arranged to provide a force to urge the cam and the cam follower toward each other, thereby maintaining the contact between the cam follower and the cam. Here, one of the cam and the cam follower is rotatable about an axis, while the other is substantially non-rotatable about the axis. The cam surface further comprises: means for causing the cam to spontaneously move relative to the cam follower with the force by the resilient member, and means for stopping the spontaneous movement of the cam relative to the cam follower while allowing a further MOVEMENT of the cam relative to the cam follower upon application of a sufficient external force.

In another construction, the hinge is for coupling a stationary member with a movable member which can be relatively moved to folded and unfolded positions with respect to the stationary member. The hinge comprises: a housing; a cam member having a cam and being contained within the housing; a cam follower member provided with a cam follower portion interacting with the cam of the cam member; and a resilient member for urging one of the cam member and cam follower member against the other so that the cam follower portion of the cam follower member and the cam of the cam member are in contact with each other. One of the cam member and the cam follower member can perform a linear motion within the housing and the other can perform a rotational motion by the linear motion, so that the movable member can rotate with respect to the stationary member. When the stationary member and the movable member are moved to the unfolded positions, the cam member and the cam follower member interact with each other so as to remain stationary at two or more predetermined unfolded positions.

In the forgoing construction of the hinge, The cam member includes a cam surface, which includes a peak and a valley. The valley is provided with two or more stopping grooves. The cam follower member includes a protrusion protruding toward the cam surface, an end of the protrusion can be inserted into the stopping grooves. The housing is engaged with one of the stationary member and the movable member. One of the cam follower member and the cam member are coupled to the other of the stationary member and the movable member. A central guide rod extending along a rotation axis is coupled to one of the cam member and the cam follower member. A guide hole into which the central guide rod is inserted is formed on the other of the cam member and the cam follower member. The cam follower member includes an extension protruding toward the exterior of the housing. The hinge further comprises a coupling member to be secured to the extension. At least one of the stopping grooves of the cam member is disposed on the slant cam surface extending between the peaks and the valleys. At least one stopping groove is provided beyond an end portion of the slant cam surface.

BRIEF DESCRIPTION OF THE DRAWINGS

The above object and features of the present invention will be apparent to a person skilled in the art when reading the following description of preferred embodiments taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. The present invention is applicable to other hinges, for example, the hinge device disclosed in Applicant's own U.S. Pat. No. 6,085,387, which is hereby incorporated herein by reference.

Figure 1:
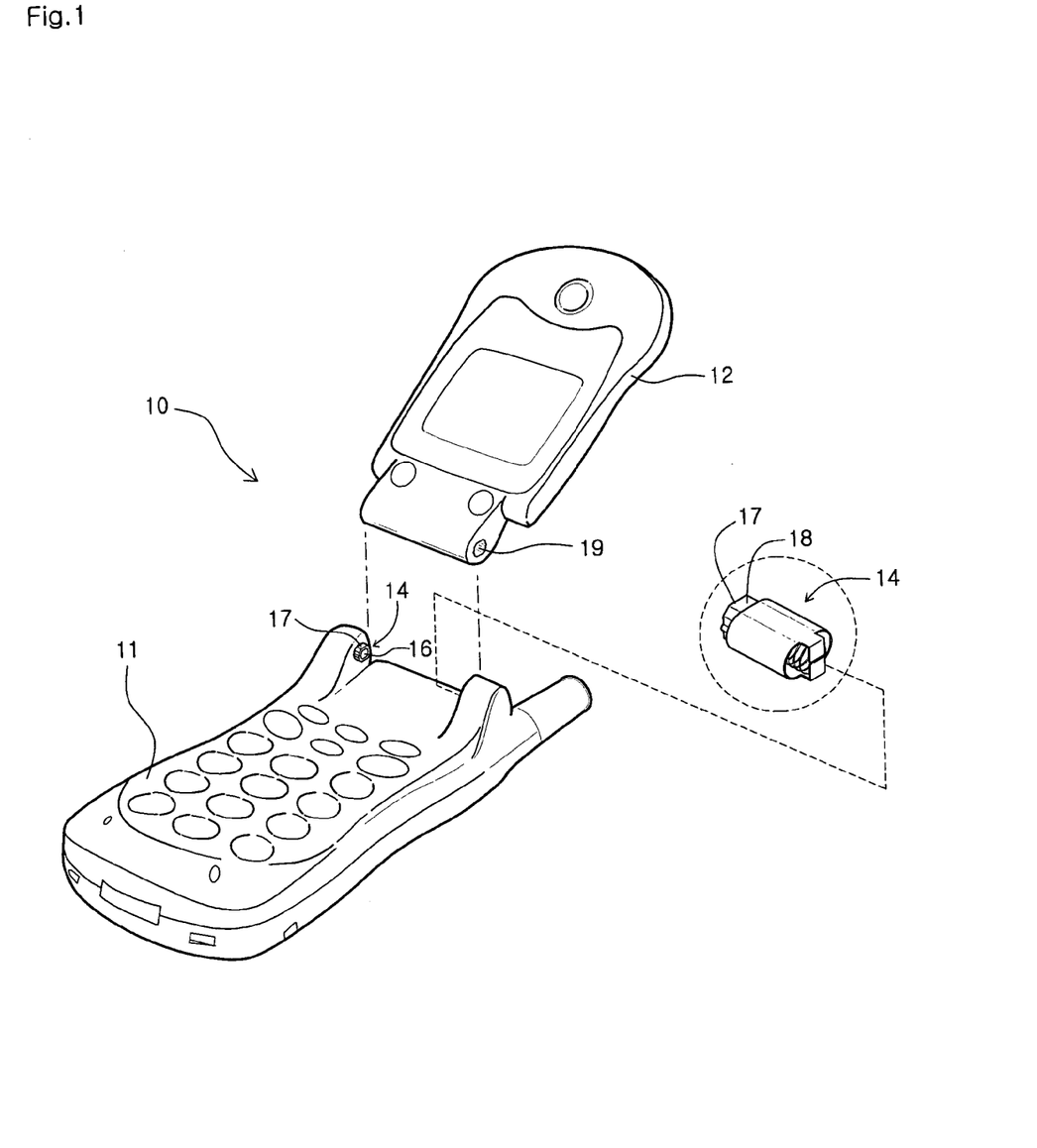
FIG. 1 is a perspective view of a folder-type radiotelephone comprising a hinge according to an embodiment of the present invention, with a first case member and a second case member disassembled and with a disassembled hinge shown on an enlarged scale.

Referring to FIG. 1, a portable folder-type radiotelephone 10 comprises a first case member 11 and a second case member 12. A hinge 14 is mounted between the first case member 11 and the second case member 12 to couple them. The hinge 14 is inserted into a mounting hole of the first case member 11. Thereafter, the second case member 12 is coupled therewith. The mounting hole has a shape substantially matching with that of a housing of the hinge 14 to prevent rotation of the entire hinge 14. In addition, the mounting hole and the hinge are sized such that there is a degree of frictional force between the mounting hole and the exterior surface of the hinge 14 to be disengaged only with considerable external force.

Referring to FIG. 1, the hinge 14 includes a rotatable extension shaft 16 which protrudes toward the second case member 12. A coupling member 17 is fitted into the extension shaft 16. The coupling member 17 includes an engaging surface 18. The second case member 12 is provided with a bushing 19 for accommodating the coupling member 17. The bushing 19 has an engaging surface interacting with the engaging surface 18. Alternatively, in another embodiment, the second case member may be provided with the extension shaft, whereas the hinge may be provided with the bushing. In a further embodiment, the extension shaft 16 may be engaged directly to the second case member without the coupling member 17.

Figure 2:
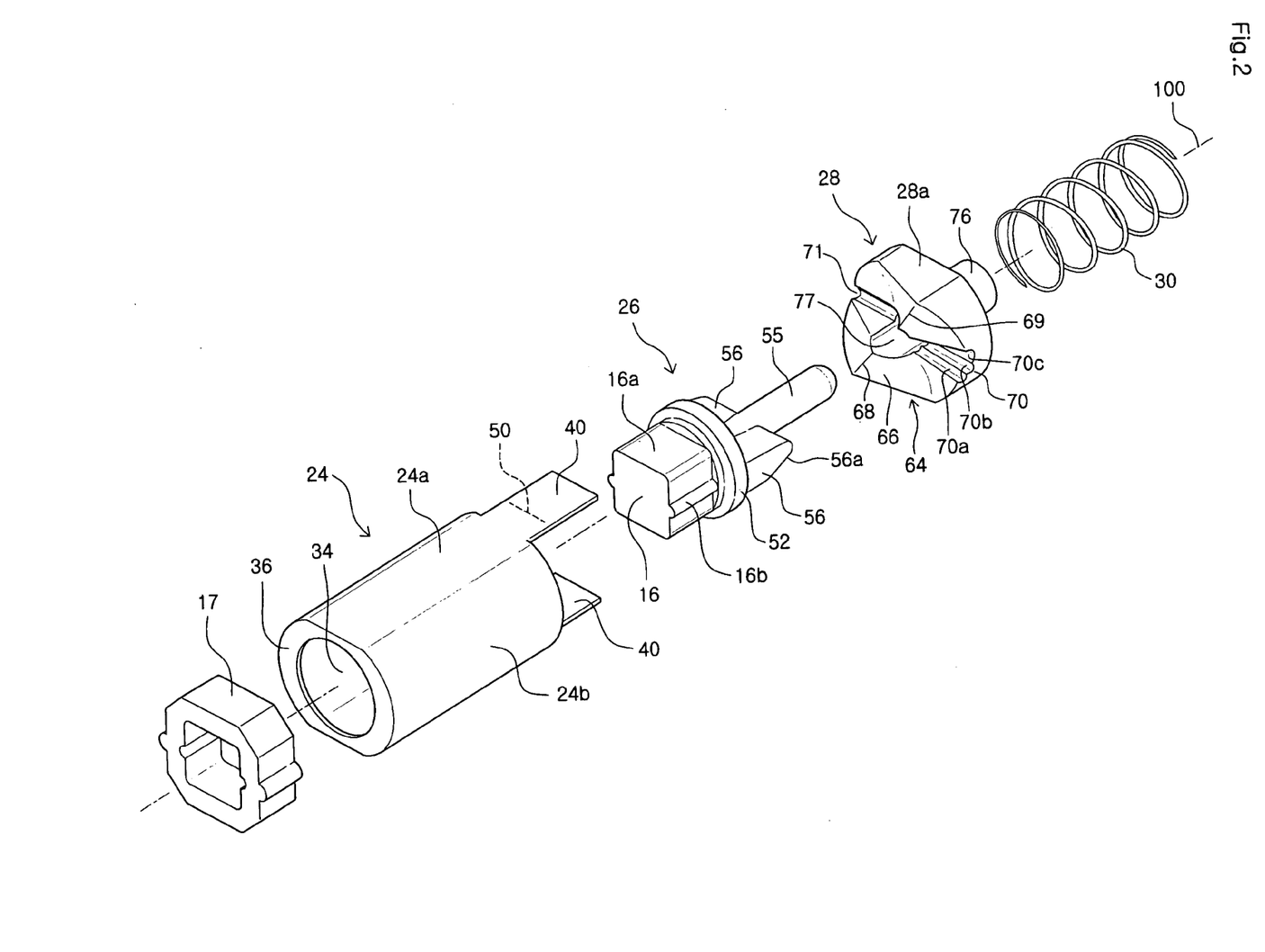
FIG. 2 is an exploded perspective view of the hinge of FIG. 1.

Referring to FIG. 2, the hinge 14 according to an embodiment of the present invention includes a housing 24, and a cam follower member 26, a cam member 28, and a resilient member 30 which are sequentially accommodated in the housing 24. The hinge 14 further includes the coupling member 17.

The housing 24 comprises of an elongated can. The housing 24 includes flat walls 24a and arc-shaped walls 24b. When the housing is fitted into the case member of the radiotelephone, the flat walls 24a function to prevent the rotation of the housing. In addition, as will be described later, the flat walls 24a also function to prevent rotation of the cam member 28 accommodated in the housing. A longitudinal centerline of the housing 24 defines a rotation axis 100 of the hinge 14. One end of the housing 24 is provided with an end wall 36 with a shaft hole 34 formed therein. The other end opposite this end is opened. The housing 24 includes extensions 40 extending from the ends of the walls 24a. After inner parts are inserted into the housing 24, the extensions 40 can be bent to cover the open end.

However, the present invention is not limited to such a method of covering the open end. In order to cover the open end so that the resilient member 30 may not protrude, other methods except the method of bending the protrusions 40 may be used. For example, even if there is no additional extension, the open end may be covered by deforming the ends of the walls 24a or 24b by means of various plastic deformation methods of metal plate after the inner parts are inserted into the housing. In addition, the open end may be covered with a cap after the parts are inserted into the housing.

It is preferred that the housing 24 be formed of metallic material such as a brass plate and be manufactured by using a deep drawing method. Alternatively, the housing 24 may be formed by injection molding plastic resin material.

Referring to FIG. 2, the cam follower member 26 includes a disk-shaped support 52 and the extension shaft 16, which extends from the center of the support 52 along the rotation axis 100. The extension shaft 16 includes engaging surfaces 16a and engaging protrusions 16b formed on the engaging surfaces. In a case where there is no coupling member 17, the engaging surfaces and engaging protrusions are engaged directly with the case member.

On the other end of the cam follower member opposite the extension shaft 16, a central guide rod 55 protrudes from the support 52. The central guide rod 55 is provided on its sides with two wings 56, which extend in a direction parallel to the rotation axis (hereinafter, referred to as "direction of rotation axis") by a length shorter than that of the central guide rod 55. The wings 56 are symmetrically disposed with respect to the rotation axis 100 of the hinge 14. The wings 56 function as a cam follower portion or cam follower. The cam follower portion or cam follower means a portion interacting with a cam surface to be described later. Each of the wings 56 is provided with a slant surface 56a by which the thickness of the wing is reduced toward its end, and the end of each wing is rounded. It can be understood by a person skilled in the art that the thickness, gradient and curvature of the end of the wing may be determined to interact with stopping grooves formed on the cam surface to be described later. Of course, the configuration of the cam follower is not limited to that of the above wings 56. In another embodiment, the cam follower may be comprised of pillars separated from the central guide rod.

The cam follower member 26 is inserted through the open end of the housing 24. The cam follower member 26 can rotate about the rotation axis 100 within the housing 24. As describe above, the extension shaft 16 of the cam follower member 26 extends through the hole 34 of the housing 24.

The coupling member 17 is fitted tightly into the extension shaft 16. The coupling member 17 is provided for the purpose of increasing the distance from the rotation axis to the engaging surfaces, the area of the engaging surfaces and the size of the engaging protrusions, thereby ensuring transmission of the rotation of the cam follower member to the case member 12 of the radiotelephone 10. Depending on the configuration of the case member 12, there may be no need for the coupling member.

Still referring to FIG. 2, the cam member 28 is fitted into the housing in such a manner that its linear motion within the housing 24 may be allowed, but its rotational motion within the housing 24 along the rotation axis can be prevented. To this end, the cam member 28 includes flat walls 28a to be matched with the shape of the housing. A cam portion 64 is formed on an end of the cam member 28 facing the cam follower member 26. The cam portion 64 includes a cam surface 66 formed on the side of the cam member facing the cam follower member 26. The cam portion 64 includes two peaks 68, 69 opposing diametrically with respect to the rotation axis 100, and two valleys 70, 71 separated by the peaks 68, 69 and opposing diametrically with respect to the rotation axis 100. The cam surface 66 consists of the peaks 68, 69, the valleys 70, 71 and a curved surface connecting the peaks 68, 69 and the valleys 70, 71.

Figure 3:
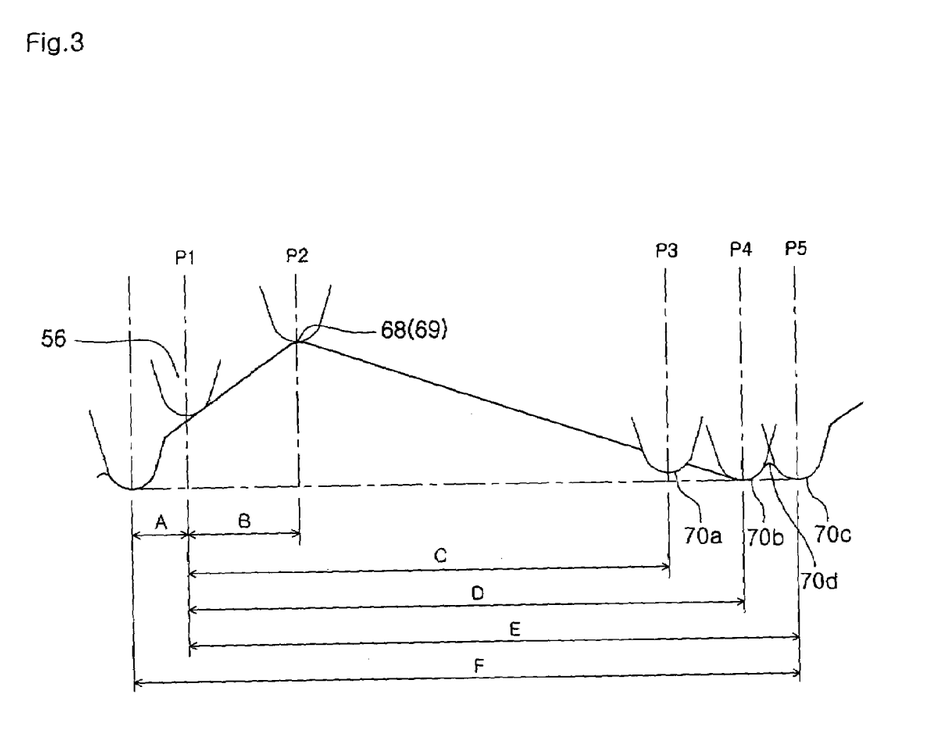
FIG. 3 is a diagram of cam profile of the hinge of FIG. 1.

As shown in FIGS. 2 and 3, the valleys 70, 71 are provided with a plurality of stopping grooves 70a, 70b, 70c. Although three grooves are shown in FIGS. 2 and 3, it is not limited thereto but there may be two, four or more grooves.

Referring to FIG. 3, the cam surface connecting the peaks and the valleys is a slant surface. A first stopping groove 70a of the cam surface 66 is formed on a lower portion of the slant surface of the cam surface. A second stopping groove 70b is formed on an end portion of the gentle slant surface of the cam surface. A third stopping groove 70c is formed behind a projection 70d beyond the end portion of the slant surface. Referring FIGS. 2 and 3, it is preferred that a radial profile of the cam surface of the cam member 28 from the rotation axis have an identical height regardless of the distance from the rotation axis.

Referring to FIG. 2 again, the cam member 28 preferably includes a cylindrical boss 76 extending along its central axis. The boss 76 is provided with a throughhole 77 extending along the rotation axis 100 to penetrate through the cam member 28. The central guide rod 55 formed on the cam follower member 26 is fitted into the throughhole 77 to guide the relative motion between the cam member and the cam follower member.

The cam member 28 is inserted through the open end of the housing 24. At this time, the cam surface is oriented to face the wings 56 of the cam follower member. The cam member is snugly inserted into the interior of the housing 24 so that its linear motion within the housing 24 along the rotation axis is allowable, but its rotational motion within the housing 24 can be prevented.

The resilient member 30 urges the cam member 28 against the cam follower member 26. The resilient member 30 may be preferably a compression coil spring, and more preferably a conical compression coil spring.

After the cam follower member 26, the cam member 28 and the resilient member 30 are sequentially inserted into the housing 24, the open end of the housing 24 is at least partially covered by bending the extensions 40 along bending lines 50 (see FIGS. 1 and 2).

The cam member, the cam follower member and the coupling member are manufactured by injection molding of plastic resin material, and preferably engineering plastic resin material. Alternatively, the members may be manufactured with metal by way of powder metallurgy.

Figure 4A:
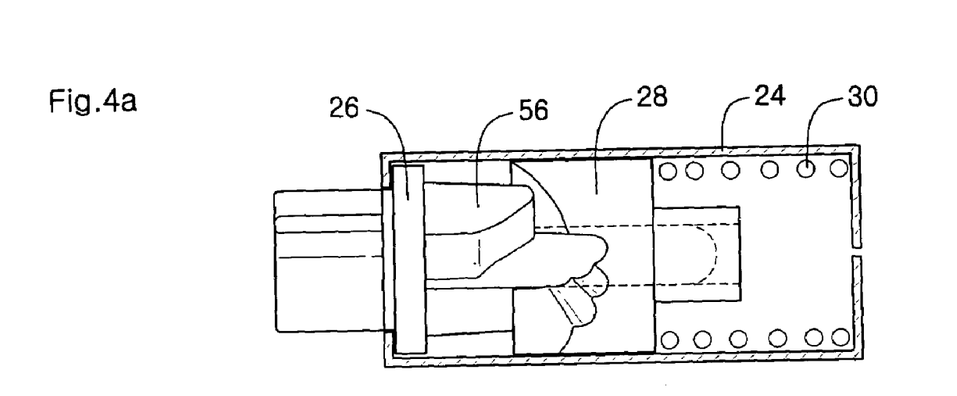
FIGS. 4a to 4c are sectional views of the hinge showing the operations of the hinge of FIG. 1.

Hereinafter, the operation of the hinge 14 according to the present invention will be explained with reference to FIGS. 3, 4a to 4c and 5. FIG. 4a shows the hinge in a state where the first case member 11 and the second case member 12 are in the folded position. At this time, the case members 11 and 12 are in contact with each other at P1 position as shown, and the wings 56 are disposed at P1 position of FIG. 3. Since the resilient member 30 urges the cam member 28 against the cam follower member 26, the wings 56 are subject to force urging the wings 56 downward of the slant surface. The force serves to rotate the cam follower member 26, and consequently, serves to urge the second case member 12 toward the first case member 11. Therefore, the first case member 11 and the second case member 12 are maintained stably in the folded state.

Figure 4B:
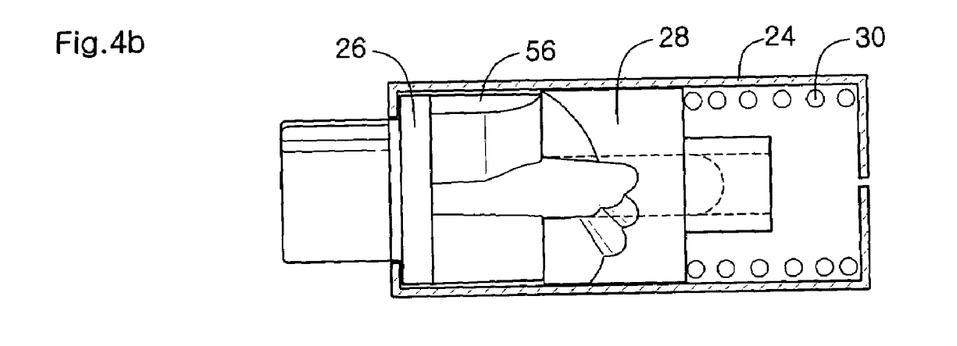

Under this condition, when the case members are moved away from each other about the hinge in order to open the radiotelephone 10 so that the radiotelephone 10 can be in use, the wings 56 reach the peaks 68 of the cam surface 66. This state is shown in FIG. 4b, which corresponds to the state where the wings are disposed at P2 position in FIGS. 3 and 5. When the case members are moved further away from each other, the wings 56 go over the peaks 68 of the cam surface 66. From the folded state where the two case members 11, 12 are in contact with each other to the state where the wings 56 go over the peaks 68 of the cam surface, the cam follower member 26 should be rotated by an angle of B or more.

When the wings 56 go over the peaks 68, 69 of the cam surface 66, the wings 56 slide down along the slant surface of the cam surface 66 without external force since the resilient member 30 is urging the cam member 28 against the cam follower member 26. At this time, the first case member 11 and the second case member 12 are spontaneously moved away from each other. During the movement of the case members 11, 12 away from each other, the wings 56 come to P4 position of FIG. 3 by inertia force and are seated into the second stopping groove 70b. At this time, the unfolded angle is designated by D (see FIGS. 3 and 5).

A user can regulate the unfolded angle, if desired. For example, when the user moves the case members 11, 12 toward each other to make the unfolded angel smaller, the wings 56 come to P3 position and are seated into the first stopping groove 70a. At this time, the unfolded angle is designated by C (see FIGS. 3 and 5).

Figure 4C:
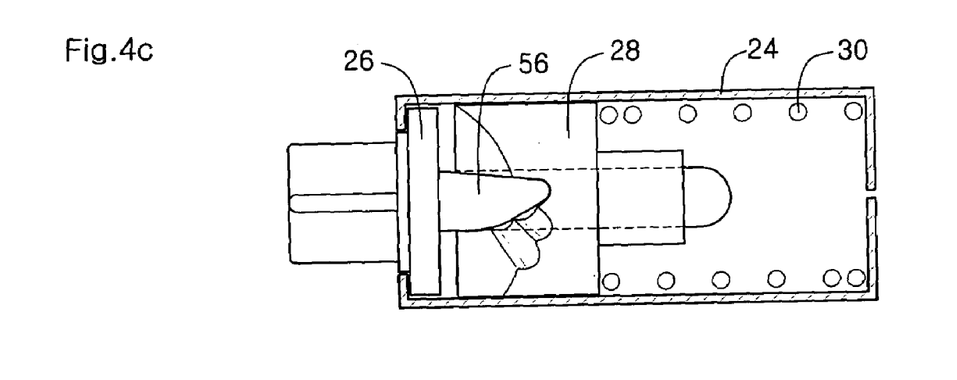
Figure 5:
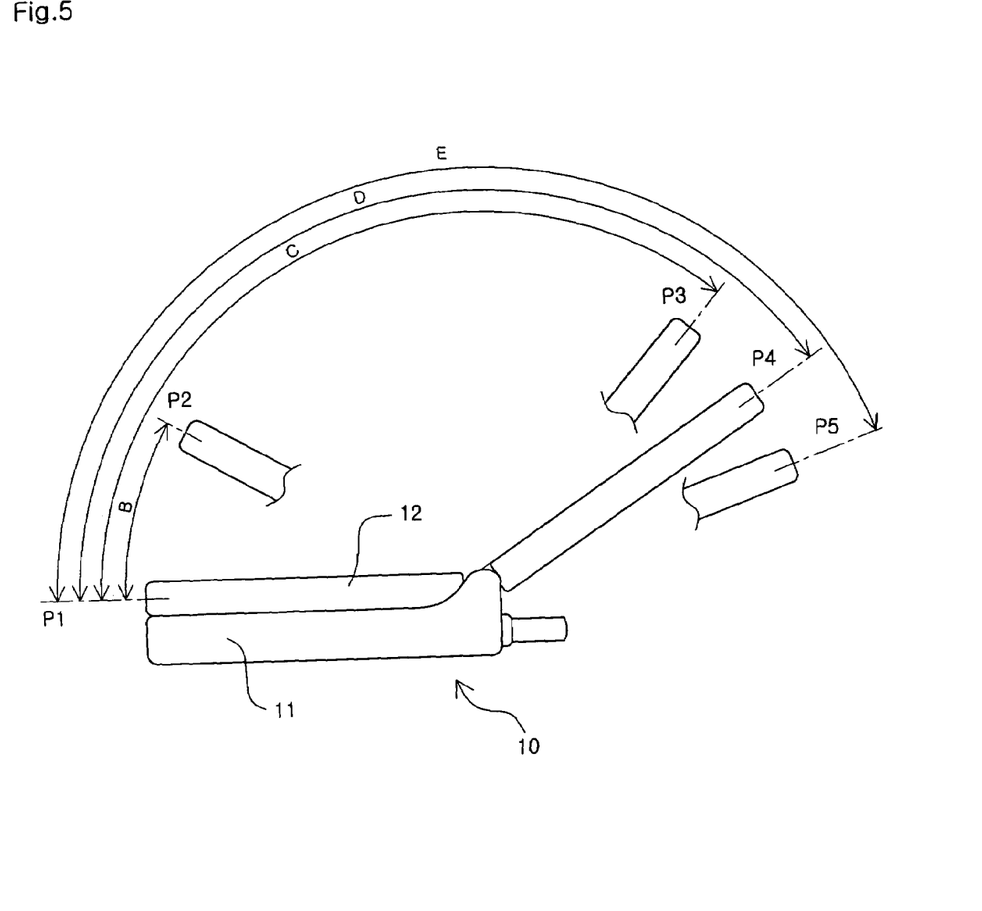
FIG. 5 is a side view showing states in which the radiotelephone of FIG. 1 can be opened or unfolded.

When the user moves the case members 11, 12 away from each other to make the unfolded angle larger, the wings 56 come to P5 position and are seated into the third stopping groove 70c. This state is shown in FIG. 4c. In this state, the case members are moved farthest away from each other so that the radiotelephone is fully opened. At this time, the unfolded angle is designated by E (see FIGS. 3 and 5).

Thus, when the unfolded angles are changed, the wings go over the projections between the stopping grooves. Therefore, the user operating the radiotelephone can have a feeling of a change of position such as a 'click' sound.

In preferred embodiments of the present invention, the unfolded angles at P3, P4 and P5 positions are set to about 130°, 150° and 163°. The user can conveniently use a variety of functions of the radiotelephone at each position. For example, assuming that the radiotelephone meets IMT 2000 standards, the user can conveniently view moving pictures (for example, watching of TV or sports broadcasting) in a state where the radiotelephone is set at P3 position and is put on a flat place. Usually, the user can talk over the radiotelephone at P4 position. In addition, the user can conveniently input short messages at P5 position. Thus, the functions that can be used at each position may be different, but they are not limited to the above functions. Furthermore, it has been described that when the case members are moved away from each other, the case members are spontaneously stopped at P4 position. However, P3 or P5 position may become the position for spontaneously stopping the case members by changing the configuration of grooves.

When the user utilizes the hinge of the present invention, the unfolded angle of the radiotelephone may be regulated. A variety of functions of the radiotelephone can be conveniently used at each position. Since the stopping grooves are provided on the cam surface, the user can have a feeling of a change of position such as a 'click' sound, so that the unfolded angle may be conveniently regulated. In addition, since the case members of the radiotelephone are moved away from each other at the predetermined angles, there is no need for the user to accurately adjust the angle. The coupling member ensures the engagement of the hinge member with the case members.

Although the present invention has been described in connection with the preferred embodiments, it is not limited thereto. It will be understood by a person skilled in the art that modifications and changes can be made to the present invention without departing from the scope and spirit of the present invention, and that the present invention is intended to include these modifications and changes.

What is claimed is:

1. A hinge for use with an electronic device, the hinge comprising:

a cam comprising a cam surface, which comprises a first sliding surface, a first stop surface, a second sliding surface and a second stop surface, wherein the first stop surface is located between the first and second sliding surfaces;

a cam follower comprising at least one cam following tip arranged to contact the cam surface;

a resilient member arranged to provide a force to urge the cam and the cam follower toward each other, thereby maintaining the contact between the cam follower and the cam;

wherein one of the cam and the cam follower is rotatable about an axis, while the other is substantially non-rotatable about the axis;

wherein the first sliding surface is configured to cause a first substantially spontaneous sliding of the at least one cam following tip thereon, which causes a first rotational movement of the rotatable member for a first angle about the axis in a rotational direction;

wherein the first stop surface is configured to stop the first substantially spontaneous sliding of the at least one cam following tip within the first stop surface, which causes to stop the first rotational movement;

wherein the second sliding surface is configured to cause a second substantially spontaneous sliding of the at least one cam following tip thereon, which causes a second rotational movement of the rotatable member for a second angle about the axis in the same rotational direction, wherein the first angle is substantially greater than the second angle; and wherein the second stop surface is configured to stop the second substantially spontaneous sliding of the at least one cam following tip within the second stop surface, which causes to stop the second rotational movement.

2. The hinge of claim 1, further comprising a housing configured to at least partially enclose the cam, the cam follower and the resilient member.

3. The hinge of claim 2, wherein the rotatable member is rotatable relative to the housing.

4. The hinge of claim 2, wherein the rotatable member has a part protruding outside the housing, and wherein the protruding part is configured to be engaged with a piece of an electronic device.

5. The hinge of claim 1, further comprising a housing engaged with the non-rotatable member.

6. The hinge of claim 1, wherein the cam is the non-rotatable member, and wherein the cam follower is the rotatable member.

7. The hinge of claim 1, wherein the cam surface is waving with reference to an imaginary plane perpendicular to the axis.

8. The hinge of claim 1, wherein the at least one cam following tip is configured to move on the cam surface along a substantially closed path.

9. The hinge of claim 1, wherein the cam surface further comprises a transition surface contacting the first stop surface and the second sliding surface therebetween, sliding of the at least one cam following tip cause a transitional rotational movement of the rotatable member for a transitional angle, wherein the transitional angle is substantially smaller than the first and second angles.

10. The hinge of claim 1, wherein the second angle is equal to or less than about 20°.

11. The hinge of claim 1, wherein the second angle is equal to about 13°.

12. The hinge of claim 1, wherein the first angle is at least about 90°.

13. The hinge of claim 1, wherein the cam surface and the at least one cam following tip are arranged such that a rotational movement of the rotatable member about the axis causes a linear movement of the non-rotatable member along the axis.

14. The hinge of claim 1, wherein the cam surface is configured such that a forced rotational movement of the rotatable member about the axis in the rotational direction beyond a predetermined point causes a spontaneous rotational movement of the rotatable member about the axis in the same rotational direction.

15. The hinge of claim 1, wherein the cam surface is configured such that a forced rotational movement of the rotatable member about the axis in the rotational direction up to less than a predetermined point causes a spontaneous rotational movement of the rotatable member about the axis in a rotational direction opposite to the forced rotational movement.

16. The hinge of claim 1, wherein the cam surface comprises at least two sloped surfaces, which are sloped with reference to one another, wherein two of the at least two sloped surfaces meet and form at least one valley or peak along where the two sloped surfaces meet.

17. The hinge of claim 16, wherein at least one of the first and second stop surfaces is located on an area of the at least two sloped surfaces, and wherein the area does not constitute the at least one valley or peak.

18. The hinge of claim 1, wherein at least one of the first and second stop surfaces comprises a groove formed in the cam surface.

19. The hinge of claim 1, wherein at least one of the first and second stop surfaces comprises a bump formed on the cam surface.

20. The hinge of claim 1, wherein at least one of the first and second stop surfaces is configured to receive the at least one cam following tip.

21. The hinge of claim 1, wherein at least one of the first and second stop surfaces is further configured to substantially maintain relative positions of the cam and the cam follower.

22. The hinge of claim 1, wherein at least one of the first and second stop surfaces is formed along a trajectory of at least one cam following tip.

23. The hinge of claim 1, wherein at least one of the first and second stop surfaces is configured to substantially block movement of the at least one cam following tip along a path thereof on the cam surface.

24. The hinge of claim 1, wherein at least one of the first and second stop surfaces comprises a threshold over which the at least one cam following tip is configured to move.

25. The hinge of claim 1, wherein the cam and the cam follower are configured such that the at least one cam following tip moves along a substantially closed path as the rotatable member rotates 360° about the axis.

26. The hinge of claim 1, wherein the cam surface comprises at least one peak along a closed path about the axis.

27. The hinge of claim 1, wherein the cam surface comprises a closed contour surface around the axis, and wherein the closed contour surface comprises at least two uphills and at least two downhills.

28. The hinge of claim 1, further comprising a guide hole and a guide rod, wherein the guide hole is formed along the axis in either of the cam and the cam follower, wherein the guide rod extends from the other of the cam and the cam follower, and wherein the guide rod is configured to be inserted in the guide hole.

29. The hinge of claim 1, wherein the cam follower comprises two protrusions positioned substantially diametrically with respect to the axis and extending toward the cam surface, and wherein a distal end of each protrusion constitutes the at least one cam following tip.

30. The hinge of claim 1, wherein each cam following tip is configured such that a point of the contact of the cam following tip with the cam surface moves as the cam and the cam follower moves relative to each other.

31. The hinge of claim 1, further comprising an adapter configured to engaged with the rotatable member and further configured to engage with an electronic device.

32. A method of operating a hinge, the method comprising:
providing a hinge, the hinge comprising:
a cam comprising a cam surface, which comprises a first sliding surface, a first stop surface, a second sliding surface and a second stop surface, wherein the first stop surface is located between the first and second sliding surfaces,
a cam follower comprising at least one cam following tip arranged to contact the cam surface,
a resilient member arranged to provide a force to urge the cam and the cam follower toward each other, thereby maintaining the contact between the cam follower and the cam,
wherein one of the cam and the cam follower is rotatable about an axis, while the other is substantially non-rotatable about the axis,
wherein the first sliding surface is configured to cause a first substantially spontaneous sliding of the at least one cam following tip thereon, which causes a first rotational movement of the rotatable member for a first angle about the axis in a rotational direction,
wherein the first stop surface is configured to stop the first substantially spontaneous sliding of the at least one cam following tip within the first stop surface, which causes to stop the first rotational movement,
wherein the second sliding surface is configured to cause a second substantially spontaneous sliding of the at least one cam following tip thereon, which causes a second rotational movement of the rotatable member for a second angle about the axis in the same rotational direction, wherein the first angle is substantially greater than the second angle, and
wherein the second stop surface is configured to stop the second substantially spontaneous sliding of the at least one cam following tip within the second stop surface, which causes to stop the second rotational movement;
rotating the rotatable member in a first rotational direction about the axis up to less than a predetermined angle; and
allowing the rotatable member to spontaneously rotate in a second rotational direction opposite to the first rotational direction about the axis.

33. A method of operating a hinge, the method comprising:
providing a hinge, the hinge comprising:
a cam comprising a cam surface, which comprises a first sliding surface, a first stop surface, a second sliding surface and a second stop surface, wherein the first stop surface is located between the first and second sliding surfaces,
a cam follower comprising at least one cam following tip arranged to contact the cam surface,
a resilient member arranged to provide a force to urge the cam and the cam follower toward each other, thereby maintaining the contact between the cam follower and the cam,
wherein one of the cam and the cam follower is rotatable about an axis, while the other is substantially non-rotatable about the axis.
wherein the first sliding surface is configured to cause a first substantially spontaneous sliding of the at least one cam following tip thereon, which causes a first rotational movement of the rotatable member for a first angle about the axis in a rotational direction.
wherein the first stop surface is configured to stop the first substantially spontaneous sliding of the at least one cam following tip within the first stop surface, which causes to stop the first rotational movement,
wherein the second sliding surface is configured to cause a second substantially spontaneous sliding of the at least one cam following tip thereon, which causes a second rotational movement of the rotatable member for a second angle about the axis in the same rotational direction, wherein the first angle is substantially greater than the second angle, and wherein the second stop surface is configured to stop the second substantially spontaneous sliding of the at least one cam following tip within the second stop surface, which causes to stop the second rotational movement;

rotating the rotatable member in a first rotational direction about the axis beyond a first predetermined angle; and allowing the rotatable member to spontaneously rotate in the first rotational direction about the axis to a first stop angle.

34. The method of claim 33, further comprising:

rotating the rotatable member in the first rotational direction about the axis from the first stop angle up to less than a second predetermined angle; and allowing the rotatable member to spontaneously rotate in a second rotational direction opposite to the first rotational direction about the axis back to the first stop angle.

35. The method of claim 33, further comprising:

rotating the rotatable member in the first rotational direction about the axis from the first stop angle beyond a second predetermined angle;

allowing the rotatable member to spontaneously rotate in the first rotational direction about the axis to a second stop angle.

36. A method of operating a hinged electronic device, the method comprising;

providing a hinged electronic device comprising: first and second body pieces, and further comprising a hinge connecting the first and second body pieces, wherein the hinge comprises:

a cam comprising a cam surface, which comprises a first sliding surface, a first stop surface, a second sliding surface and a second stop surface, wherein the first stop surface is located between the first and second sliding surfaces, a cam follower comprising at least one cam following tip arranged to contact the cam surface, a resilient member arranged to provide a force to urge the cam and the cam follower toward each other, thereby maintaining the contact between the cam follower and the cam, wherein one of the cam and the cam follower is rotatable about an axis, while the other is substantially non-rotatable about the axis, wherein the first sliding surface is configured to cause a first substantially spontaneous sliding of the at least one cam following tip thereon, which causes a first rotational movement of the rotatable member for a first angle about the axis in a rotational direction, wherein the first stop surface is configured to stop the first substantially spontaneous sliding of the at least one cam following tip within the first stop surface, which causes to stop the first rotational movement, wherein the second sliding surface is configured to cause a second substantially spontaneous sliding of the at least one cam following tip thereon, which causes a second rotational movement of the rotatable member for a second angle about the axis in the same rotational direction, wherein the first angle is substantially greater than the second angle, wherein the second stop surface is configured to stop the second substantially spontaneous sliding of the at least one cam following tip within the second stop surface, which causes to stop the second rotational movement, and wherein the first body piece is connected with the rotatable member, and the second body piece is connected with the non-rotatable member;

rotating the first body piece in a rotational direction about the axis relative to the second body piece beyond a predetermined point; and allowing a spontaneous rotational movement of the first body piece relative to the second body piece in the rotational direction about the axis.

37. The method of claim 36, wherein the connection between the first body piece and the rotatable member is such that the first body piece is substantially not rotatable with reference to the rotatable member about the axis.

38. The method of claim 36, wherein the electronic device further comprises an adapter via which the first body piece and the rotatable member are connected.

39. The method of claim 36, wherein the connection between the second body piece and the non-rotatable member is such that the second body piece is substantially not rotatable with reference to the non-rotatable member about the axis, while allowing a linear movement of the non-rotatable member with reference to the non-rotatable member along the axis.

40. The method of claim 36, wherein the electronic device further comprises a housing configured to at least partially enclose the cam, the cam follower and the resilient member, wherein the second body piece and the non-rotatable member are connected via the housing.

41. The method of claim 40, wherein the second body piece defines a hollow for receiving the housing.

42. The method of claim 36, wherein at least one of the first and second body pieces comprises a display panel.

43. The method of claim 36, wherein at least one of the first and second body pieces comprises a keypad for inputting characters or numbers.

44. The method of claim 36, wherein the electronic device further comprises an additional hinge, wherein the first and second body pieces are connected with each other via the two hinges.

45. The method of claim 36, wherein the first and second body pieces are configured to rotate with each other about the axis between an open configuration and a closed configuration, and wherein in either of the open and closed configurations, the first and second body pieces can rotate with each other about the axis in one rotational direction only.

46. The method of claim 36, wherein the first and second body pieces are configured to spontaneously rotate relative to the other in a rotational direction about the axis if the first and second body pieces are positioned between the open and closed configurations and if the at least one cam following tip is contacting the first sliding surface of the cam surface.

47. The method of claim 36, wherein the spontaneous rotational movement of the first body piece relative to the second body piece is for a rotational angle about the axis at least about 10°.

48. The method of claim 36, wherein the spontaneous rotational movement of the first body piece relative to the second body piece is stopped when the at least one cam following tip contacts at least one of the first and second stop surfaces.

49. The method of claim 36, wherein rotating comprises rotating the first body piece in a rotational direction about the axis relative to the second body piece until the at least one cam following tip contacts at least one of the first and second stop surfaces.

50. A method of operating a hinged electronic device, the method comprising:
   providing a hinged electronic device comprising: first and second body pieces and further comprising a hinge connecting the first and second body pieces, the hinge comprising:
      a cam comprising a cam surface, which comprises a first sliding surface, a first stop surface, a second sliding surface and a second stop surface, wherein the first stop surface is located between the first and second sliding surfaces,
      a cam follower comprising at least one cam following tip arranged to contact the cam surface,
      a resilient member arranged to provide a force to urge the cam and the cam follower toward each other, thereby maintaining the contact between the cam follower and the cam,
      wherein one of the cam and the cam follower is rotatable about an axis, while the other is substantially non-rotatable about the axis,
      wherein the first sliding surface is configured to cause a first substantially spontaneous sliding of the at least one cam following tip thereon, which causes a first rotational movement of the rotatable member for a first angle about the axis in a rotational direction,
      wherein the first stop surface is configured to stop the first substantially spontaneous sliding of the at least one cam following tip within the first stop surface, which causes to stop the first rotational movement,
      wherein the second sliding surface is configured to cause a second substantially spontaneous sliding of the at least one cam following tip thereon, which causes a second rotational movement of the rotatable member for a second angle about the axis in the same rotational direction, wherein the first angle is substantially greater than the second angle,
      wherein the second stop surface is configured to stop the second substantially spontaneous sliding of the at least one cam following tip within the second stop surface, which causes to stop the second rotational movement, and
      wherein the first body piece is connected with the rotatable member, and the second body piece is connected with the non-rotatable member;
   rotating the first body piece in a rotational direction about the axis relative to the second body piece up to less than a predetermined point; and
   allowing a spontaneous rotational movement of the first body piece relative to the second body piece in the opposite rotational direction about the axis.

* * * * *